S. B. STORER.
ELECTRIC CURRENT AND VOLTAGE REGULATOR.
APPLICATION FILED FEB. 6, 1906.
914,892.
Patented Mar. 9, 1909.
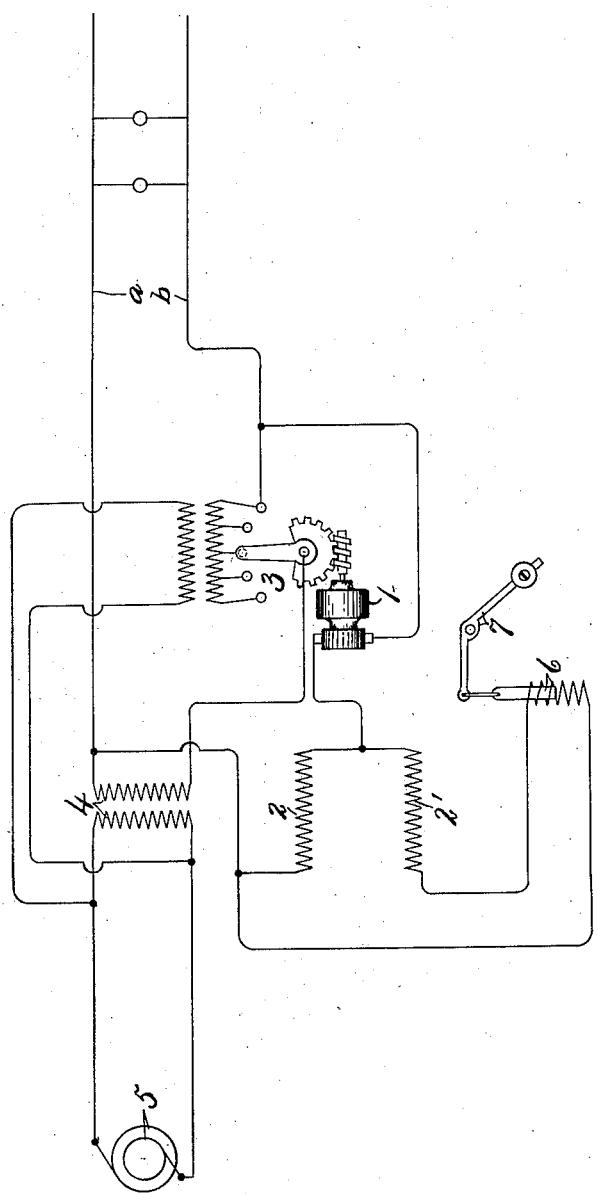

UNITED STATES PATENT OFFICE.

SIMON B. STORER, OF SYRACUSE, NEW YORK.

ELECTRIC CURRENT AND VOLTAGE REGULATOR.

No. 914,892.   Specification of Letters Patent.   Patented March 9, 1909.

Application filed February 6, 1906. Serial No. 299,683.

*To all whom it may concern:*

Be it known that I, SIMON B. STORER, of Syracuse, in the county of Onondaga, in the State of New York, have invented new and useful Improvements in Electric Current and Voltage Regulators, of which the following, taken in connection with the accompanying drawings, is a full, clear, and exact description.

This invention relates to certain improvements in electric current and voltage regulators by which a predetermined voltage or current may be automatically maintained in one or more parts or devices of an electrical distributing system, irrespective of the variations which may occur in the initial voltage or current.

The specific object of these improvements is to maintain a predetermined or constant value in one side of an electrical or magnetic balance, or in one of two opposing torques and to utilize the variations in the other above or below such value for various purposes, as for instance, the operation of a regulator to maintain a constant current or voltage in one or more primal or derived circuits; or to operate an electrical measuring device, as for instance, a Watt meter, to indicate or register the amount of energy consumed above a predetermined rate of consumption.

It will be evident, however, from the following description that the essential features of my invention may be applied to the operation of any form or current or voltage regulator, field or other rheostat which may be used for the purpose of regulating either directly or indirectly the voltage or current in any circuit or circuits, and in any other connection or association where it is desired to maintain a constant current, voltage or torque in one side or part of any electrical or magnetic device to act in opposition to what may be a variable current, voltage or torque.

In Figure 1, I have shown the essential features of my invention diagrammatically as applied to the operation of a voltage regulator for maintaining a constant current or voltage in an electrical distributing system. In the apparatus shown, I make use of a normally balanced differential wound motor which comprises essentially an armature —1— and opposing field windings —2— and —2'— for operating a regulator —3— to maintain a constant current or voltage in an electric circuit —a—b—, which in this instance, derives its electro motive force from a transformer —4— or alternating current generator —5—.

The broad principle of maintaining an approximately constant voltage of current at any point or points in a system of electrical distribution through the medium of variations in one side or the other of an electrical or mechanical balance is fully explained in either of my co-pending applications No. 273,641 or 273,642, both of which were filed August 10, 1905, and the differential wound motor and regulator operated thereby of my present invention, as disclosed is similar in operation and function to that set forth in my pending application No. 273,642, except that I employ a different means for controlling the operation of the device, which means, whether used in connection with a motor actuated regulator, or with an electric meter constitutes the subject-matter of my present application.

It will be seen that the differential wound motor is electrically connected across and derives current from the circuit —a—b—, but approximately one-half of its winding, as the side —2— derives current from the circuit —a—b— at the side of the regulator where the voltage is to be kept constant so that any changes in the voltage of this circuit will correspondingly effect the current flowing in this half or side —2— of the winding. The other half or side —2'— of the motor-winding derives current from the same source, but may be either side of the regulator, and in series with this latter half or side —2'— of the motor-winding, is placed any suitable electro mechanical device, as a solenoid —6— which is counteracted by a weight-angle —7—, whereby a constant current or voltage is maintained in the latter half, as the side —2'—, of the regulating motor. Assuming now that the two opposing windings —2— and —2'— of the regulating motor are electrically or magnetically balanced under a predetermined current or voltage, then it is obvious that any variations in the circuit to be regulated, above or below such predetermined value, would cause the winding which is subject to these variations to become stronger or weaker than the winding in which the current is maintained at a constant value by means of the device referred to above. These variations would, of course, cause the motor to be actuated in one direction or the other according to the increase or decrease of the voltage or current above or below the predetermined value at which the electrical or magnetic balance is established, and in this operation of the motor would consequently actuate the regulator —3— to restore the voltage or current in the circuit —a—b— to its normal value, at which value the windings are again balanced and the motor is at rest.

Having described my invention, what I claim is:

1. An electric voltage regulator comprising two electrical elements opposing each other, and automatic means comprising a solenoid having a movable plunger and retracting means therefor, for maintaining a constant value in one of the opposing elements.

2. An electric voltage regulator comprising two electrical elements opposing each other to produce a balance, means comprising a solenoid having a movable plunger and retracting means therefor, for automatically maintaining a predetermined current in one of the opposing elements.

3. An electric voltage regulator comprising a normally balanced electrical device, and means comprising a solenoid having a movable plunger and retracting means therefor, for maintaining a constant value in one side of the balance and bringing the other side back to equal said value.

4. In an electrical distributing system, two electrically opposed elements in which an electrical balance is maintained under a predetermined voltage, an electrical circuit deriving current from said system, and means comprising a solenoid having a movable plunger and retracting means therefor brought into action by a variation in the balance of said opposing elements to maintain a constant voltage in said circuit.

In witness whereof I have hereunto set my hand this 29th day of January 1906.

SIMON B. STORER.

Witnesses:
H. E. CHASE,
M. M. NOTT.